(12) United States Patent
Nguyen et al.

(10) Patent No.: US 8,910,344 B2
(45) Date of Patent: Dec. 16, 2014

(54) SYSTEMS AND METHODS FOR CASTER OBSTACLE MANAGEMENT

(75) Inventors: Long Q. Nguyen, Tustin, CA (US);
Daniel Bauen, Atlanta, GA (US);
Cassilyn Bair, Atlanta, GA (US);
Lawrence E. Davis, Atlanta, GA (US)

(73) Assignee: Alcon Research, Ltd., Fort Worth, TX (US)

( * ) Notice: Subject to any disclaimer, the term of this patent is extended or adjusted under 35 U.S.C. 154(b) by 21 days.

(21) Appl. No.: 13/017,099

(22) Filed: Jan. 31, 2011

(65) Prior Publication Data

US 2011/0247173 A1    Oct. 13, 2011

Related U.S. Application Data

(60) Provisional application No. 61/321,627, filed on Apr. 7, 2010.

(51) Int. Cl.
*B60B 33/00* (2006.01)
*B60B 7/00* (2006.01)
*B60B 7/06* (2006.01)

(52) U.S. Cl.
CPC .............. *B60B 33/0073* (2013.01); *B60B 7/00* (2013.01); *B60B 33/0042* (2013.01); *B60B 7/061* (2013.01); *B60B 33/0057* (2013.01); *B60B 33/0049* (2013.01); *B60B 33/0068* (2013.01)
USPC .......................... 16/18 B; 16/32; 16/34; 16/40

(58) Field of Classification Search
CPC .. B60B 33/0042; B60B 33/0015; A61G 5/06; A61G 5/061; B62B 5/02; B62B 5/028
USPC .................................. 16/32, 34, 18 CG, 18 B
See application file for complete search history.

(56) References Cited

U.S. PATENT DOCUMENTS

| 2,351,997 A | 6/1944 | Morrill |
| 2,450,062 A | 9/1948 | Voss et al. |

(Continued)

FOREIGN PATENT DOCUMENTS

| BR | 8504205 | 4/1987 |
| CH | 223517 A | 9/1942 |

(Continued)

OTHER PUBLICATIONS

International Searching Authority, Written Opinion of the International Searching Authority, International Application No. PCT/US2011/023107, Mar. 31, 2011, 7 pages.

(Continued)

*Primary Examiner* — Emily Morgan

(57) ABSTRACT

In various embodiments, a caster assembly may include a wheel rotatably coupled to a caster housing and a deflector tab pivotably coupled to the caster housing and offset from an outer wheel circumference for use in moving or traversing obstacles encountered during wheel movement. In some embodiments, the deflector tab may include at least one retaining element configured to hold the deflector tab in a pusher position or allow movement of the deflector tab into a ramp position. In the pusher position, the deflector tab may push a mobile obstacle in front of the wheel motion. In the ramp position, the deflector tab may facilitate moving the wheels over a fixed obstacle.

8 Claims, 5 Drawing Sheets

(56) References Cited

U.S. PATENT DOCUMENTS

| | | | |
|---|---|---|---|
| 3,239,872 A * | 3/1966 | Kitrell | 16/18 R |
| 3,652,103 A | 3/1972 | Higgs | |
| 3,818,542 A | 6/1974 | Jones | |
| 3,890,668 A | 6/1975 | Stosberg et al. | |
| 3,920,014 A | 11/1975 | Banko | |
| 4,025,099 A | 5/1977 | Virden | |
| 4,110,866 A | 9/1978 | Ishii | |
| 4,143,442 A | 3/1979 | Harlang | |
| 4,467,496 A * | 8/1984 | Gregg | 16/18 B |
| 4,550,221 A | 10/1985 | Mabusth | |
| 4,550,808 A | 11/1985 | Folson | |
| 4,616,888 A | 10/1986 | Peterman | |
| 4,633,544 A | 1/1987 | Hicks | |
| 4,669,580 A | 6/1987 | Neville | |
| 4,675,485 A | 6/1987 | Paukert | |
| 4,677,706 A | 7/1987 | Screen | |
| 4,744,536 A | 5/1988 | Bancalari | |
| 4,811,966 A | 3/1989 | Singleton | |
| 4,941,552 A | 7/1990 | Screen | |
| 5,046,534 A | 9/1991 | Vandenbroucke et al. | |
| D325,086 S | 3/1992 | Charles et al. | |
| 5,112,019 A | 5/1992 | Metzler et al. | |
| 5,242,035 A | 9/1993 | Lange | |
| 5,249,121 A | 9/1993 | Baum et al. | |
| 5,273,043 A | 12/1993 | Ruike | |
| 5,315,290 A | 5/1994 | Moreno et al. | |
| D352,106 S | 11/1994 | Fanney et al. | |
| 5,456,336 A | 10/1995 | Bopp | |
| 5,624,352 A | 4/1997 | Smale | |
| 5,650,597 A | 7/1997 | Redmayne | |
| 5,655,542 A | 8/1997 | Weilandt | |
| 5,702,117 A * | 12/1997 | Geelhoed | 280/160 |
| 5,766,146 A | 6/1998 | Barwick, Jr. | |
| 5,788,651 A | 8/1998 | Weilandt | |
| 5,788,688 A | 8/1998 | Bauer et al. | |
| 5,794,639 A | 8/1998 | Einbinder | |
| 5,800,383 A | 9/1998 | Chandler et al. | |
| 5,810,765 A | 9/1998 | Oda | |
| 5,823,302 A | 10/1998 | Schweninger | |
| 5,827,149 A | 10/1998 | Sponable | |
| 5,830,180 A | 11/1998 | Chandler et al. | |
| 5,857,685 A | 1/1999 | Phillips et al. | |
| 5,859,629 A | 1/1999 | Tognazzini | |
| 5,876,016 A | 3/1999 | Urban et al. | |
| 5,880,538 A | 3/1999 | Schulz | |
| 5,964,313 A | 10/1999 | Guy | |
| 5,988,323 A | 11/1999 | Chu | |
| 6,024,720 A | 2/2000 | Chandler et al. | |
| 6,034,449 A | 3/2000 | Sakai et al. | |
| 6,047,634 A | 4/2000 | Futsuhara et al. | |
| 6,055,458 A | 4/2000 | Cochran et al. | |
| 6,109,572 A | 8/2000 | Urban et al. | |
| 6,126,617 A | 10/2000 | Weilandt et al. | |
| 6,232,758 B1 | 5/2001 | Konda et al. | |
| 6,251,113 B1 | 6/2001 | Appelbaum et al. | |
| 6,276,485 B1 | 8/2001 | Eriksson et al. | |
| D447,567 S | 9/2001 | Murphy et al. | |
| 6,322,523 B2 | 11/2001 | Weilandt et al. | |
| 6,357,765 B1 | 3/2002 | Heien | |
| 6,409,187 B1 | 6/2002 | Crow, Jr. | |
| 6,429,782 B2 | 8/2002 | Pavatich et al. | |
| D467,001 S | 12/2002 | Buczek et al. | |
| 6,501,198 B2 | 12/2002 | Taylor et al. | |
| 6,503,208 B1 | 1/2003 | Skovlund | |
| 6,520,929 B2 | 2/2003 | Zaleski | |
| 6,530,598 B1 | 3/2003 | Kirby | |
| 6,532,624 B1 | 3/2003 | Yang | |
| 6,587,750 B2 | 7/2003 | Gerbi et al. | |
| 6,590,171 B1 | 7/2003 | Wolf et al. | |
| 6,619,438 B1 | 9/2003 | Yang | |
| 6,626,445 B2 | 9/2003 | Murphy et al. | |
| 6,662,404 B1 | 12/2003 | Stroh et al. | |
| 6,678,917 B1 | 1/2004 | Winters et al. | |
| 6,749,538 B2 | 6/2004 | Slawinski et al. | |
| 6,824,539 B2 | 11/2004 | Novak | |
| 6,854,568 B2 | 2/2005 | Kun-Tsai | |
| 6,944,910 B2 | 9/2005 | Pauls | |
| 6,969,032 B2 | 11/2005 | Olivera et al. | |
| 6,971,617 B2 | 12/2005 | Nguyen et al. | |
| 7,036,185 B2 * | 5/2006 | Morndal et al. | 16/18 B |
| 7,065,812 B2 | 6/2006 | Newkirk et al. | |
| 7,100,716 B2 * | 9/2006 | Engels et al. | 180/65.1 |
| D550,362 S | 9/2007 | Olivera et al. | |
| 7,454,839 B2 | 11/2008 | Della Bona et al. | |
| 7,509,747 B2 | 3/2009 | Sudou et al. | |
| 7,685,660 B2 | 3/2010 | Chinn | |
| 7,708,120 B2 | 5/2010 | Einbinder | |
| 7,878,289 B2 | 2/2011 | Standke | |
| 7,986,525 B2 * | 7/2011 | Wang | 361/679.59 |
| 8,015,666 B2 * | 9/2011 | Wang | 16/320 |
| 8,060,982 B2 * | 11/2011 | Magoz et al. | 16/83 |
| 2001/0023331 A1 | 9/2001 | Kanda et al. | |
| 2004/0004331 A1 | 1/2004 | Pauls | |
| 2004/0119484 A1 | 6/2004 | Basir et al. | |
| 2004/0226187 A1 | 11/2004 | Bruntz et al. | |
| 2005/0004559 A1 | 1/2005 | Quick et al. | |
| 2005/0088417 A1 | 4/2005 | Mulligan | |
| 2005/0230575 A1 | 10/2005 | Zelenski et al. | |
| 2005/0234441 A1 | 10/2005 | Bisch et al. | |
| 2006/0031989 A1 | 2/2006 | Graham et al. | |
| 2006/0113733 A1 * | 6/2006 | Kazaoka | 280/5.24 |
| 2006/0149426 A1 | 7/2006 | Unkrich et al. | |
| 2006/0267295 A1 | 11/2006 | You | |
| 2007/0051566 A1 | 3/2007 | Marlow | |
| 2007/0124858 A1 | 6/2007 | Ahlman | |
| 2008/0033361 A1 | 2/2008 | Evans et al. | |
| 2008/0114290 A1 | 5/2008 | King et al. | |
| 2008/0126969 A1 | 5/2008 | Blomquist | |
| 2008/0189173 A1 | 8/2008 | Bakar et al. | |
| 2008/0223650 A1 | 9/2008 | Standke | |
| 2009/0036271 A1 | 2/2009 | Brand et al. | |
| 2009/0040181 A1 | 2/2009 | Darnell et al. | |
| 2009/0045021 A1 | 2/2009 | Einbinder | |
| 2009/0069799 A1 | 3/2009 | Daw et al. | |
| 2009/0090434 A1 | 4/2009 | Brand et al. | |
| 2009/0143734 A1 | 6/2009 | Humayun et al. | |
| 2009/0231095 A1 * | 9/2009 | Gray | 340/5.64 |
| 2009/0289431 A1 | 11/2009 | Geeslin | |
| 2010/0049119 A1 | 2/2010 | Norman et al. | |
| 2010/0058557 A1 | 3/2010 | Wang | |
| 2011/0247173 A1 | 10/2011 | Nguyen et al. | |
| 2011/0247903 A1 * | 10/2011 | Boukhny et al. | 188/68 |
| 2011/0251548 A1 | 10/2011 | Koontz et al. | |

FOREIGN PATENT DOCUMENTS

| | | |
|---|---|---|
| CN | 2273269 | 1/1998 |
| CN | 2273269 Y | 1/1998 |
| DE | 2102508 B2 | 6/1973 |
| DE | 3016615 A1 | 11/1981 |
| DE | 3039611 A1 | 4/1982 |
| DE | 3203886 A1 | 9/1983 |
| DE | 8910606 U1 | 10/1989 |
| DE | 4344187 A1 | 6/1995 |
| DE | 19504073 C1 | 8/1996 |
| DE | 19620059 A1 | 11/1997 |
| DE | 10047006 C2 | 4/2002 |
| DE | 20308670 U1 | 2/2004 |
| DE | 10332823 A1 | 2/2005 |
| DE | 202005016310 U1 | 1/2006 |
| DE | 202007008797 U1 | 8/2007 |
| DE | 102006049071 B3 | 11/2007 |
| DE | 102008015505 A1 | 2/2009 |
| DE | 102007053444 A1 | 5/2009 |
| DE | 102009058919 A1 | 6/2011 |
| EP | 0701917 A1 | 3/1996 |
| EP | 0865055 A1 | 9/1998 |
| EP | 0979741 A2 | 2/2000 |
| EP | 1016580 A1 | 7/2000 |
| EP | 1024071 A1 | 8/2000 |
| EP | 1180473 A1 | 2/2002 |
| EP | 0901388 B1 | 1/2003 |
| EP | 1964750 A1 | 9/2008 |
| EP | 2106986 A1 | 10/2009 |

(56) References Cited

FOREIGN PATENT DOCUMENTS

| | | |
|---|---|---|
| EP | 1016578 B1 | 3/2010 |
| EP | 2173154 B1 | 1/2011 |
| EP | 2292202 A2 | 3/2011 |
| ES | 2285964 | 11/2007 |
| FR | 2648101 | 12/1990 |
| FR | 2799410 A1 | 4/2001 |
| FR | 2880700 A1 | 7/2006 |
| GB | 210851 | 2/1924 |
| GB | 767159 | 1/1957 |
| GB | 2061105 | 5/1981 |
| GB | 2132478 | 7/1984 |
| GB | 2260195 A | 4/1993 |
| GB | 2260622 A | 4/1993 |
| GB | 2303675 A | 2/1997 |
| GB | 2441303 A | 3/2008 |
| JP | 54-95851 | 7/1979 |
| JP | 54-095851 | 7/1979 |
| JP | 61-150834 | 7/1986 |
| JP | 1-68637 | 5/1989 |
| JP | 02-107245 | 4/1990 |
| JP | 03-062902 | 3/1991 |
| JP | 03-190919 | 8/1991 |
| JP | 03-252266 | 11/1991 |
| JP | 04-063328 | 2/1992 |
| JP | H06-061504 | 8/1994 |
| JP | H09-010195 | 1/1997 |
| JP | 09-058203 | 3/1997 |
| JP | 09-113071 | 5/1997 |
| JP | H10-057419 | 3/1998 |
| JP | H10-264603 | 10/1998 |
| JP | 10-297206 | 11/1998 |
| JP | 11-169411 | 6/1999 |
| JP | 11-244339 | 9/1999 |
| JP | 2001-001703 | 1/2001 |
| JP | 2001-058503 | 3/2001 |
| JP | 2003-220803 | 8/2003 |
| JP | 2005-162113 | 6/2005 |
| JP | 2005-296606 | 10/2005 |
| JP | 2006-131198 A | 5/2006 |
| JP | 2006-341670 | 12/2006 |
| JP | 2007-137305 | 6/2007 |
| JP | 2009-512971 | 3/2009 |
| JP | 2010-508104 | 3/2010 |
| JP | 2010-088490 | 4/2010 |
| WO | 96/19143 A1 | 6/1996 |
| WO | WO 98/25556 A1 | 6/1998 |
| WO | WO 00/12150 A1 | 3/2000 |
| WO | WO 00/18012 A1 | 3/2000 |
| WO | 01/61431 A1 | 8/2001 |
| WO | WO 02/043571 A2 | 6/2002 |
| WO | WO 02/043571 A3 | 4/2003 |
| WO | 03/068580 A1 | 8/2003 |
| WO | WO 03/093408 A1 | 11/2003 |
| WO | WO 2004/017521 A1 | 2/2004 |
| WO | WO 2004/082554 A2 | 9/2004 |
| WO | WO 2004/082554 A3 | 3/2005 |
| WO | WO 2006/073400 A1 | 7/2006 |
| WO | WO 2008/052752 A1 | 5/2008 |
| WO | WO 2008/053485 A1 | 5/2008 |
| WO | WO 2009/073691 A2 | 6/2009 |
| WO | WO 2009/073769 A2 | 6/2009 |
| WO | WO 2009/073691 A3 | 7/2009 |
| WO | WO 2009/073769 A3 | 7/2009 |
| WO | WO 2010/020200 A1 | 2/2010 |
| WO | WO 2010/027255 A1 | 3/2010 |
| WO | WO 2010/027255 A8 | 3/2010 |
| WO | WO 2011/126596 A1 | 10/2011 |
| WO | WO 2011/126597 A1 | 10/2011 |
| WO | WO 2011/127231 A1 | 10/2011 |

OTHER PUBLICATIONS

International Searching Authority, International Search Report, International Application No. PCT/US2011/023107, Mar. 31, 2011, 2 pages.

International Searching Authority, International Search Report, International Application No. PCT/US11/23103, Mar. 30, 2011, 2 pages.

International Searching Authority, Written Opinion of the International Searching Authority, International Application No. PCT/US11/23103, Mar. 30, 2011, 4 pages.

International Searching Authority, International Search Report, PCT/US2011/031500, Jun. 16, 2011, 2 pages.

International Searching Authority, Written Opinion of the International Searching Authority, PCT/US2011/031500, Jun. 16, 2011, 6 pages.

Steinco brochure accessed through http://web.archive.org/web/20080731183316/http://www.steinco.de/service/downloads.aspx?id=6901 & accessed through http://web.archive.org/web/20080731183316/http://www.steinco.de/en/Castors_Hospital.aspx—original date believed to be Jul. 31, 2008, 2 pages.

http://web.archive.org/web/20090526022232/http://www.touchsensor.com/engineers.html?bcsi_scan_0A8B7FA59D377CC3=w1 . . . (web archive dated May 26, 2009) (2 pages).

http://web.archive.org/web/20090322184659/http://www.touchsensor.com/technology_switch.html (web archive dated Mar. 22, 2009) (2 pages).

European Patent Office, Extended European Search Report, EP 11766297.3, Jul. 31, 2013, 7 pages.

* cited by examiner

SYSTEMS AND METHODS FOR CASTER OBSTACLE MANAGEMENT

PRIORITY CLAIM

This application claims the benefit of priority of U.S. Provisional Patent Application Ser. No. 61/321,627 titled "Systems and Methods for Caster Obstacle Management", filed on Apr. 7, 2010, whose inventors are Long Q. Nguyen, Cassilyn Bair, Daniel Bauen, and Lawrence E. Davis, which is hereby incorporated by reference in its entirety as though fully and completely set forth herein.

FIELD OF THE INVENTION

The present invention generally pertains to wheels. More particularly, but not by way of limitation, the present invention pertains to enhanced wheel maneuverability.

DESCRIPTION OF THE RELATED ART

When moving wheeled vehicles such as equipment carts and consoles (e.g., surgical consoles), obstacles (e.g., cables, debris, floor ledges, etc.) may inhibit rotation/movement of one or more of the wheels. This may potentially cause the cart or console to tip over and/or lead to operator frustration.

SUMMARY

In various embodiments, a caster assembly may include a wheel rotatably coupled to a caster housing and a deflector tab pivotably coupled to the caster housing and offset from the wheel for use in moving or traversing obstacles encountered by the caster assembly during wheel movement. In some embodiments, a retaining element may provide a force on the deflector tab to hold the deflector tab in a pusher position when the deflector tab encounters a mobile obstacle (such as a cable) during wheel movement. In some embodiments, the retaining element may allow movement of the deflector tab to move into a ramp position when the deflector tab encounters a fixed obstacle (such as an obstacle fixed to the floor) during wheel movement.

In some embodiments, the retaining element may be a spring loaded axle coupling the deflector to the caster housing. In some embodiments, the retaining element may include a first and second retaining element. For example, the deflector tab may include a first retaining element (e.g., a permanent or electro- magnet) positioned to correspond with the second retaining element coupled to the caster housing. The first retaining element and the second retaining element may be configured to hold (e.g., via an attractive force between the first and second retaining element) the deflector tab in the pusher position when the deflector tab encounters a mobile obstacle. In some embodiments, the first retaining element and the second retaining element may allow movement of the first retaining element relative to the second retaining element (e.g., the two magnets may separate) to allow the deflector tab to move into a ramp position when the deflector tab encounters a fixed obstacle.

When in the pusher position, the deflector tab may push the first obstacle in front of the wheel movement to prevent the first obstacle from inhibiting wheel movement. When in the ramp position, the deflector tab may provide a ramped surface to allow the respective caster to be moved over the obstacle via a sliding or rolling motion between the ramped surface of the deflector tab and the second obstacle. In the ramp position, the deflector tab may rest against a stub coupled to the caster housing to support the deflector tab in the ramp position.

BRIEF DESCRIPTION OF THE DRAWINGS

For a more complete understanding of the present invention, reference is made to the following description taken in conjunction with the accompanying drawings in which.

It is to be understood that both the foregoing general description and the following detailed description are exemplary and explanatory only and are intended to provide a further explanation of the present invention as claimed.

DETAILED DESCRIPTION OF THE EMBODIMENTS

Figure 1:
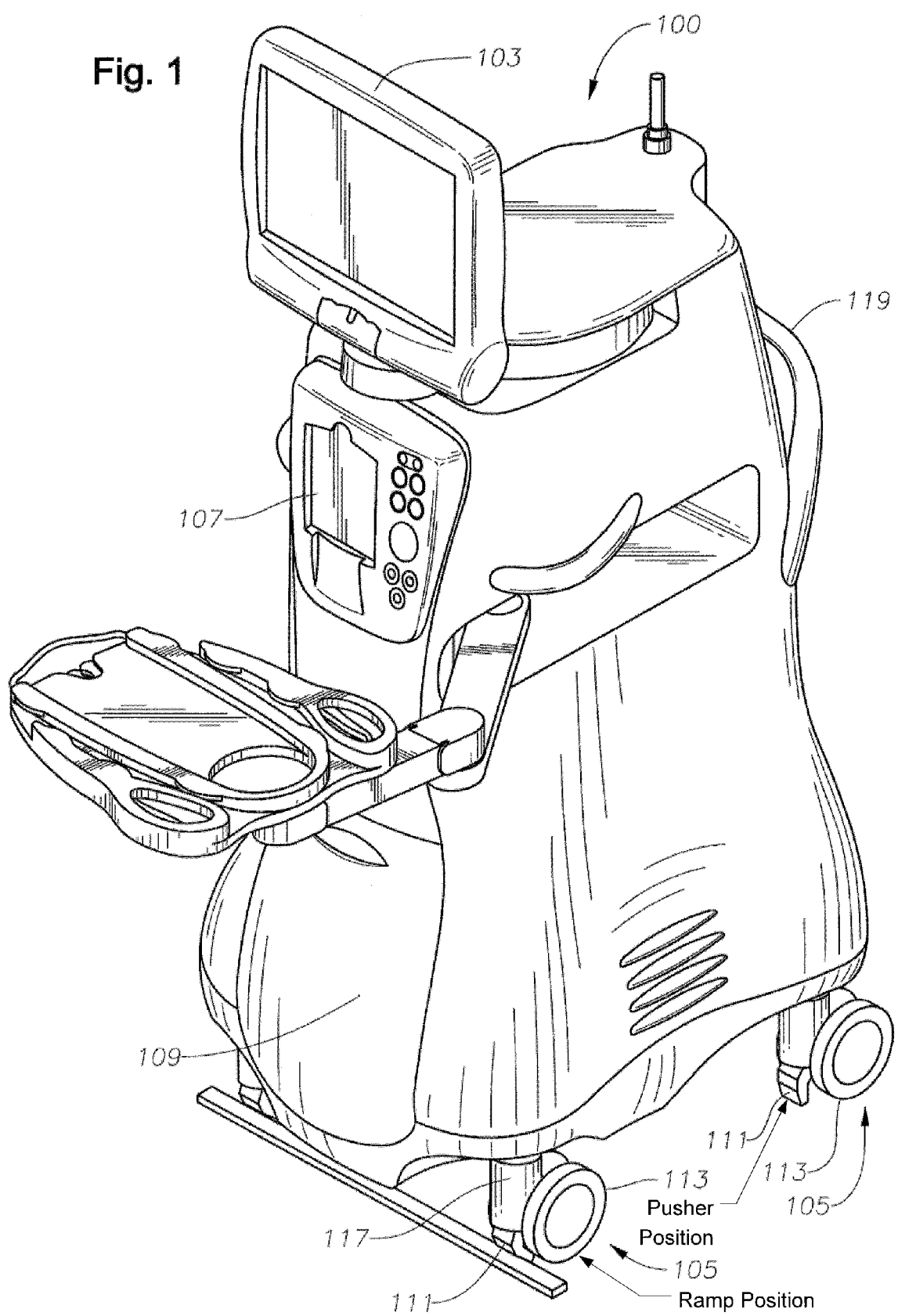
FIG. 1 is a surgical console with deflector tab casters, according to an embodiment.

FIG. 1 illustrates an embodiment of a surgical console 100 with deflector casters 105. The deflector casters 105 may use deflector tabs 111 movable between at least two positions during caster movement for managing obstacles (e.g., a pusher position and a ramp position). In a pusher position, deflector tabs 111 on the casters 105 may be extended in front of caster wheels 113 to push movable obstacles (e.g., cables or debris) in front of a wheel's path as the console is moved. In a ramp position, the deflector tabs 111 may pivot to provide an angled surface ahead of the wheel movement to provide a ramp to pull the caster wheel 113 up and over a fixed obstacle (such as a ledge). Upon clearing the obstacle, the deflector tab 111 may be returned to the pusher position.

In some embodiments, the surgical console 100 may include, among other equipment, a touchscreen 103, fluidics cassette 107, handle 119, and auxiliary equipment bay 109. While deflector casters 105 are disclosed herein with respect to a surgical console 100 for use in ophthalmic procedures, it is to be understood that the deflector casters 105 may be used with other equipment carts and consoles.

Figures 2A, 2B:
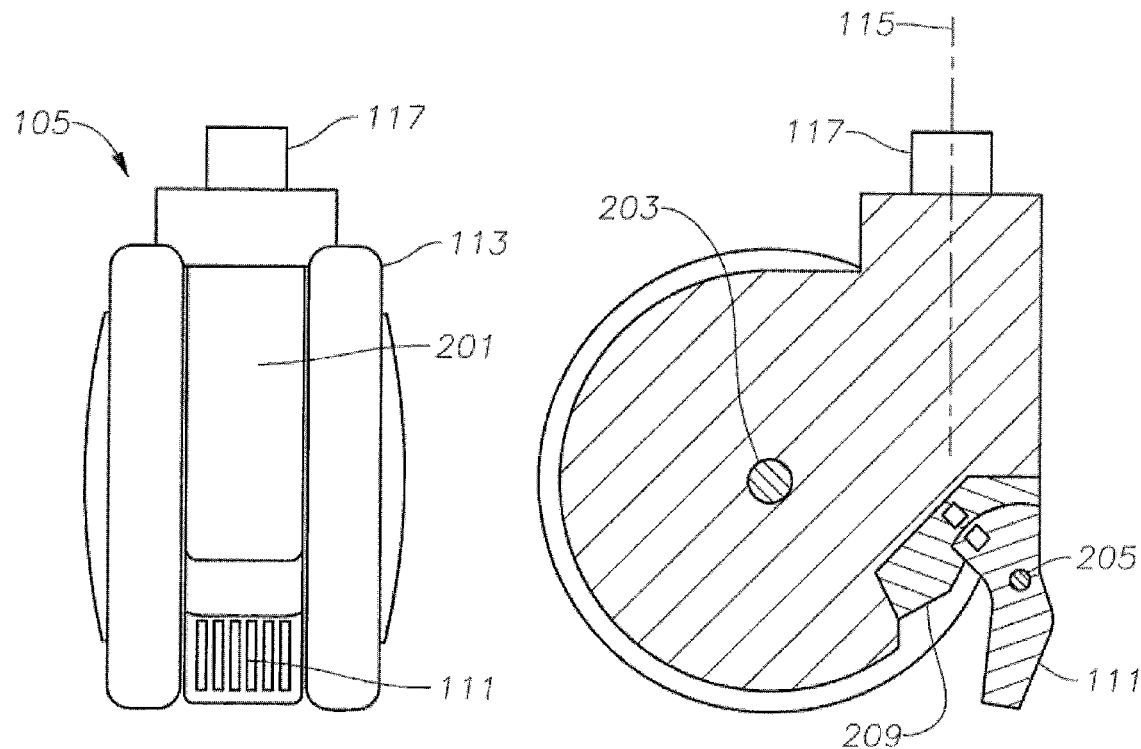
FIGS. 2a-f illustrate cross sections of the deflector tab caster, according to an embodiment.

FIGS. 2a-d illustrate cross sectional views of an embodiment of a deflector caster 105. As seen in FIG. 2a, the deflector caster 105 may include a two-part wheel with wheels on either side of a caster housing 201 and configured to rotate relative to the caster housing 201 (e.g., both wheel portions may be connected through a central shaft 203 that is fixed to or rotates relative to the caster housing 201). Other wheel configurations are also contemplated (e.g., a single wheel coupled to the caster housing 201). In some embodiments, the deflector tab 111 may pivot, on pivot pin 205 coupled to the caster housing 201, between the pusher and ramp positions. At least one retaining element (e.g., a spring or magnet) may be used to hold the deflector tab 111 in the pusher position or allow movement of the deflector tab 111 into the ramp position.

In some embodiments, the caster wheels 113 may be able to rotate around a caster pivot axis 115 (e.g., 360 degrees around the axis) to align with the direction of console movement (the wheels 113 may also rotate on the shaft 203). As seen in FIG. 2b, the caster wheels 113 may be offset from the caster pivot axis 115 and may swing around the pivot axis 115 during movement such that the caster wheel 113 may trail the pivot axis 115 in the direction of wheel movement. The caster housing 201 may be coupled to the caster mount 117 which may be rotatably coupled (e.g., to console 100) along the pivot axis 115. The deflector tab 111 may be coupled to the caster housing 201 such that the deflector tab 111 may rotate with the mount 117 as the caster wheel 113 rotates. This may position the deflector tab in front of the caster wheel 113 in the direction of wheel movement. In some embodiments, the deflector tab 111 may extend to the ground or be just slightly above the ground (e.g., within a range of 0.01 mm to 1 cm off of the ground) (other distances off of the ground are also possible). In various embodiments, the wheels 113, caster housing 201, caster mount 117, and deflector tab 111 may be made of various suitable materials (e.g., hard plastic, metal, etc).

Figure 2C:
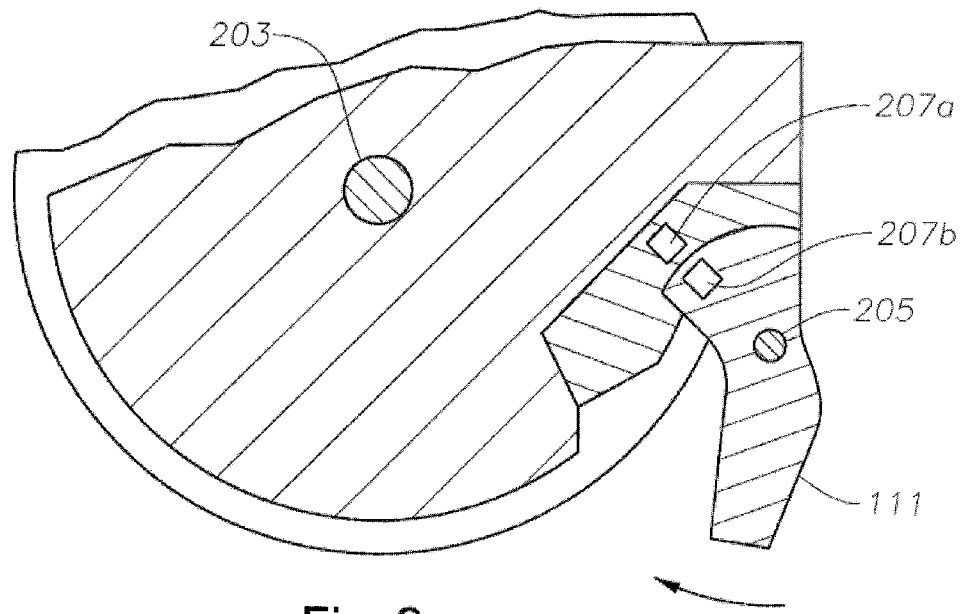

As seen in FIG. 2c (a cross sectional view through the caster housing 201) the retaining element may include a first retaining element 207a and a second retaining element 207b. For example, the first and second retaining elements may include magnets (e.g., permanent or electro-magnets). Other retaining elements may also be used. The deflector tab 111 may be held in the pusher position through an attractive force between retaining element 207a in the caster housing 201 and retaining element 207b in the deflector tab 111. In some embodiments, the strength of the magnets may be configured to cause the deflector tab 111 to resist pivoting along the pivot 205 for mobile obstacles (e.g., obstacles that exert less than a threshold force on the deflector tab 111 as the deflector tab 111 pushes up against the obstacle during movement). A mobile obstacle may include a loose cable on the floor that may be pushed by the deflector tab 111 during caster movement instead of the deflector tab 111 pivoting. The strength of the magnets may be further configured to allow the deflector tab 111 to pivot inward when encountering a fixed obstacle (e.g., an obstacle that pushes up against the deflector tab 111 at greater than a threshold force as the deflector tab 111 pushes up against the obstacle during movement). For example, the fixed obstacle may be a ledge on the floor (such as encountered moving into an elevator). Other fixed obstacles may include very heavy objects (that are immovable relative to the surgical console by virtue of the frictional force between the obstacle and the floor). Upon release of the force pushing the tab into the ramp position (e.g., when the caster wheel 113 has cleared the obstacle), the attractive force between the first and second retaining elements (e.g., magnets) may pull the deflector tab 111 back into the pusher position.

Figure 2D:
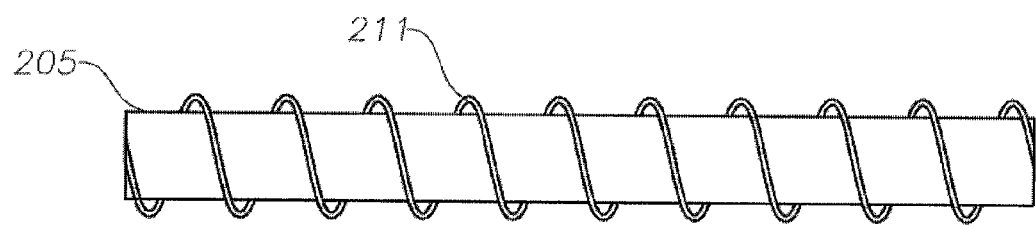
Figure 2E:
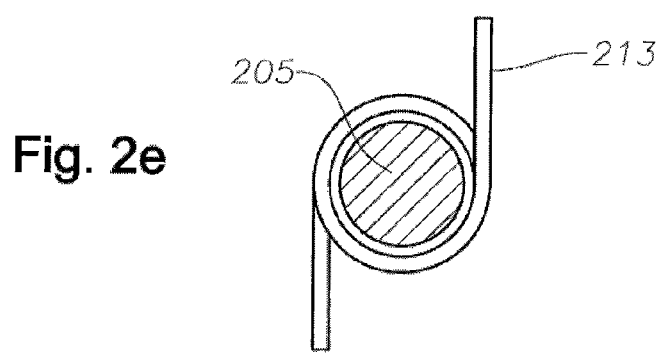
Figure 2F:
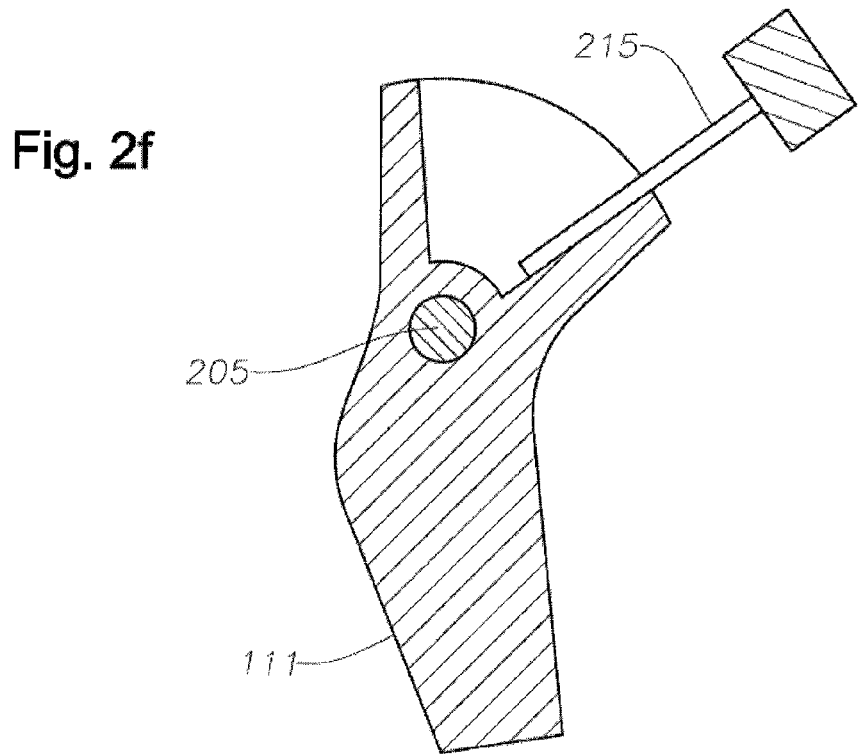

As seen in FIGS. 2d-f, the at least one retaining element may include a single retaining element. For example, the retaining element may include a spring (e.g., spring 211 as shown in FIG. 2d or spring 213 as shown in FIG. 2e) on pivot pin 205 to turn the pivot pin 205 into a spring loaded axle that provides a rotation force on the deflector tab 111 relative to the caster housing 201. As another example, the spring may be separate from the pivot pin 205 (e.g., see spring 215 in FIG. 2f). In some embodiments, the spring loaded pivot pin 205 may be used instead of or in addition to first and second retaining elements 207a,b. The deflector tab 111 may be held in the pusher position through an anti-rotation force applied to the deflector tab 111 through the pivot pin 205 as the deflector tab encounters a movable obstacle. In some embodiments, the spring strength may be configured to allow the deflector tab 111 to pivot inward when encountering a fixed obstacle. Upon release of the force (e.g., when the caster wheel 113 has cleared the obstacle), the spring loaded axle may pull the deflector tab 111 back into the pusher position. In some embodiments, the deflector tab 111 may be coupled to the spring such that rotation of the deflector tab 111 winds/unwinds the spring on the pivot pin (which may be coupled to and fixed relative to the caster housing 201). Other single retaining elements are also possible (e.g., a single spring mounted between the caster housing 201 and an end of the deflector tab 111 to hold the deflector tab 111 in the pusher position unless a force (operating on the other side of the pivot pin 205 than the spring force) greater than the spring force pushes the deflector tab 111 into the ramp position).

Figure 3:
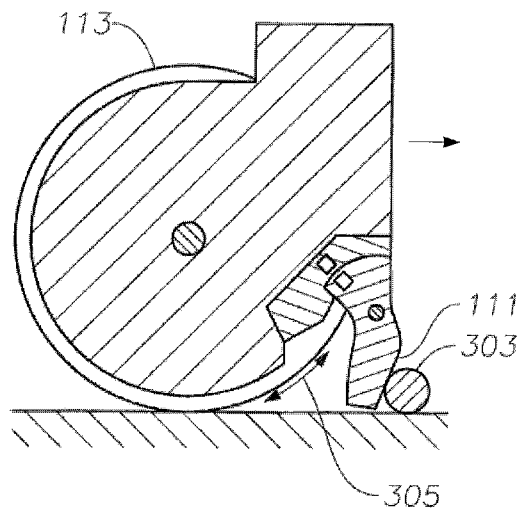
FIG. 3 illustrates movement of the deflector tab in a pusher position, according to an embodiment.

FIG. 3 illustrates movement of the deflector tab 111 in a pusher position, according to an embodiment. As seen in FIG. 3, as the deflector tab 111 encounters an obstacle such as cable 303 (shown in cross section), the retaining element (such as spring loaded axle 205 or magnets 207a,b) may hold the deflector tab 111 in a pusher position to facilitate pushing the obstacle in front of the caster wheel to prevent the obstacle from inhibiting wheel rotation. As seen in FIG. 3, the deflector tab 111 may be offset from an outer wheel circumference 305.

Figure 4A:
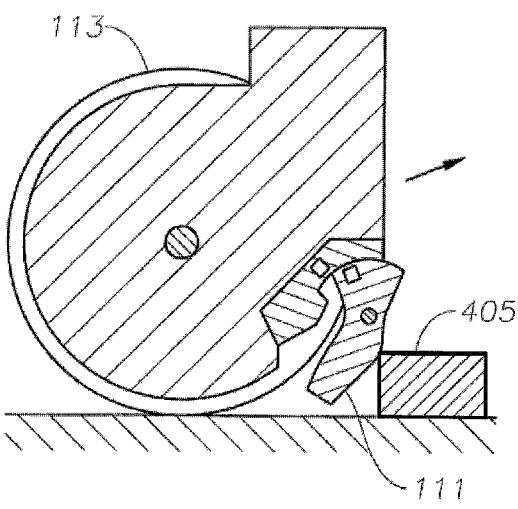
FIGS. 4a-c illustrate movement of the deflector tab in a ramp position, according to an embodiment.
Figure 4B:
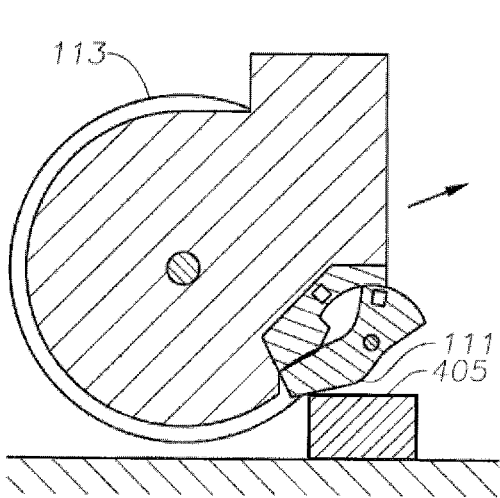
Figure 4C:
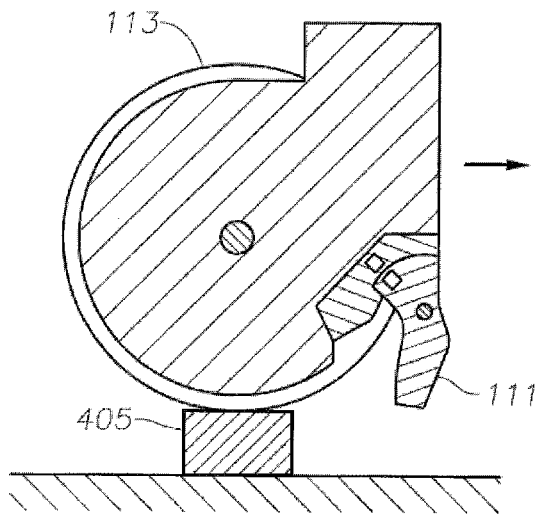
Figure 5:
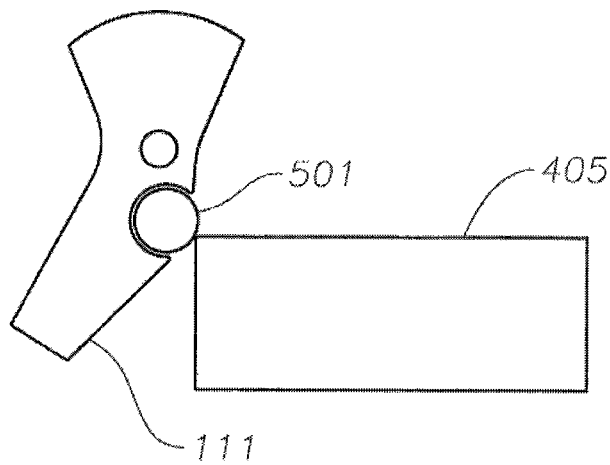
FIG. 5 illustrates an embodiment of the deflector tab with a rolling mechanism.

FIGS. 4a-c illustrate an embodiment of movement of the deflector tab 111 through a ramp position. When the deflector tab 111 encounters a larger (or fixed) obstacle 405 such as a floor threshold or elevator floor lip, the force from the spring loaded axle 205 and/or between the magnets 207a,b may not be sufficient to keep the deflector tab 111 in the pusher position and the deflector tab 111 may move into a ramp position. As seen in FIG. 2b, in some embodiments, the caster housing may include a stub 209 (e.g., made of a folded piece of sheet metal or a steel rod) to support and limit travel of the deflector tab 111 as the deflector tab 111 moves into a ramped position. In some embodiments, a stub may not be used (e.g., the deflector tab 111 may rest against an outer surface of the caster housing 201 or wheel 113 when in the ramp position). In the ramp position, the caster 105 may slide up the obstacle 405 along the ramp provided by the deflector tab 111 in the ramp position (see FIGS. 4a-b). In some embodiments, the deflector tab 111 may be made of a plastic or metal material with a smooth outer surface to reduce friction between the deflector tab 111 and the obstacle. In some embodiments, the deflector tab 111 may include a roller mechanism (e.g., a cylindrical or spherical roller 501 as seen in FIG. 5). The roller 501 may be positioned inside a cavity in the deflector tab 111 and may be secured to the roller 501 through a separate pivot pin through the roller 501 and deflector tab 111. In some embodiments, the roller 501 may be secured to the deflector tab 111 without a pivot pin. For example, the sides of the cavity may wrap around the roller 501 enough to prevent the roller 501 from coming out of the cavity while allowing the roller 501 to extend past the cavity to roll along an obstacle 405. The roller 501 may be made of stainless steel (other materials are also possible). As seen in FIG. 4c, when the deflector tab 111 clears the obstacle 405, the deflector tab 111 may return to the pusher position (e.g., through the attractive force of the magnets 207a,b).

Figure 6:
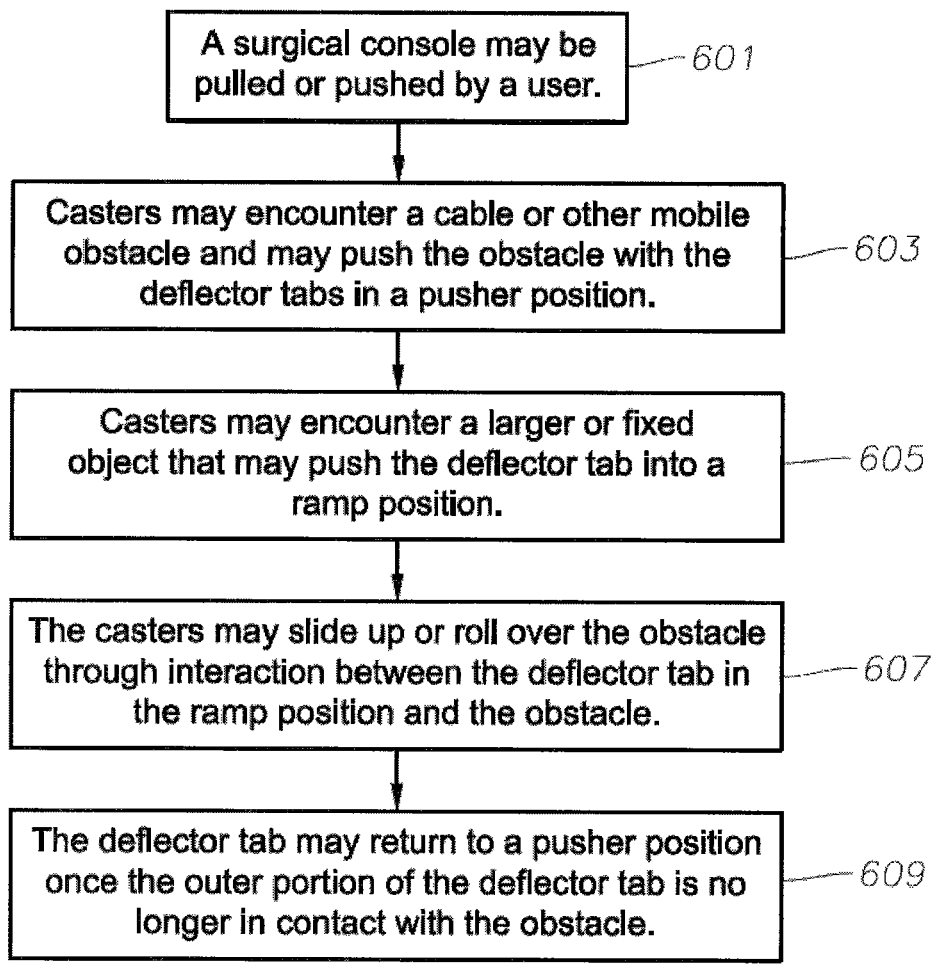
FIG. 6 illustrates a flowchart of a method of caster operation, according to an embodiment.

FIG. 6 illustrates a flowchart of an embodiment of a method of caster operation. The elements provided in the flowchart are illustrative only. Various provided elements may be omitted, additional elements may be added, and/or various elements may be performed in a different order than provided below.

At 601, a surgical console 100 may be pulled or pushed by a user. For example, the user may push the surgical console 100 by applying a force on the console through the handle 119.

At 603, casters 105 may encounter a cable or other mobile obstacle and may push the obstacle with the deflector tabs 111 in a pusher position. As seen in FIG. 3, the deflector tab 111 may maintain a pusher position to push the cable in front of the caster wheel 113 to prevent the cable from coming in contact with the caster wheel and inhibiting wheel rotation.

At 605, casters 105 may encounter a larger or fixed object that may push the deflector tab 111 into a ramp position.

At 607, the casters 105 may slide up or roll over the obstacle through interaction between the deflector tab in the ramp position and the obstacle. For example, as seen in FIGS. 4*a*-*b*, the deflector tab 111 may provide a ramped surface for the casters 105 to ride up and over the obstacle.

At 609, the deflector tab 111 may return to a pusher position once the outer portion of the deflector tab 111 is no longer in contact with the obstacle.

Various modifications may be made to the presented embodiments by a person of ordinary skill in the art. Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An apparatus, comprising:
   a wheel rotatably coupled to a caster housing about a wheel axis, wherein the caster housing is rotatable about a caster pivot axis and wherein the wheel is offset from the caster pivot axis to swing around the caster pivot axis during wheel rotation such that the wheel trails the caster pivot axis in the direction of wheel movement;
   a deflector tab having two ends, the deflector tab is pivotably coupled to the caster housing at a tab pivot point between the two ends, and one end at least partially extending beyond an outer wheel circumference, wherein the tab pivot point is located on a side of the caster pivot axis opposite the wheel axis, and is located below the wheel axis; and
   a first magnet coupled to the deflector tab and a second magnet coupled to the caster housing;
   wherein a magnetic pull between the first magnet and the second magnet is configured to be strong enough to hold the deflector tab in a pusher position when the deflector tab encounters a movable cable during wheel movement; and
   wherein the magnetic pull between the first magnet and the second magnet is configured to be weak enough to allow movement of the first magnet relative to the second magnet to allow the deflector tab to move into a ramp position when the deflector tab is deflected by a relatively immobile obstacle during wheel movement.

2. The apparatus of claim 1, wherein the deflector tab is configured to push the movable cable in front of the wheel movement to prevent the movable cable from inhibiting wheel movement.

3. The apparatus of claim 1, wherein when the deflector tab is in the ramped position, the deflector tab is configured to allow the apparatus to be moved up a ramped surface, formed between the deflector tab and the relatively immobile obstacle, over the relatively immobile obstacle.

4. The apparatus of claim 1, further comprising a stub coupled to the caster housing configured to limit travel of the deflector tab when the deflector tab moves into the ramp position by abutting against a side of the deflector tab that is not in contact with the immobile obstacle.

5. The apparatus of claim 1, wherein the deflector tab further comprises a roller positioned on an outer surface of the deflector tab to engage the relatively immobile obstacle when the deflector tab is in the ramp position.

6. The apparatus of claim 1, wherein at least one of the first magnet and the second magnet is an electro-magnet.

7. The apparatus of claim 1, wherein the caster housing comprises an outer edge that is located in front of the wheel and above the tab pivot point during wheel movement.

8. The apparatus of claim 7, wherein the outer edge is parallel to a caster axis of the caster housing.

* * * * *